Nov. 21, 1961     F. D. ALEXANDER ET AL     3,009,413

PELLETING MECHANISM

Filed Feb. 3, 1958                               3 Sheets-Sheet 1

INVENTORS
FREDERICK D. ALEXANDER,
ERWIN P. POLLITT,
ROY E. SMITH.
BY
ATTORNEYS.

Nov. 21, 1961　　F. D. ALEXANDER ET AL　　3,009,413
PELLETING MECHANISM
Filed Feb. 3, 1958　　　　　　　　　　3 Sheets-Sheet 2
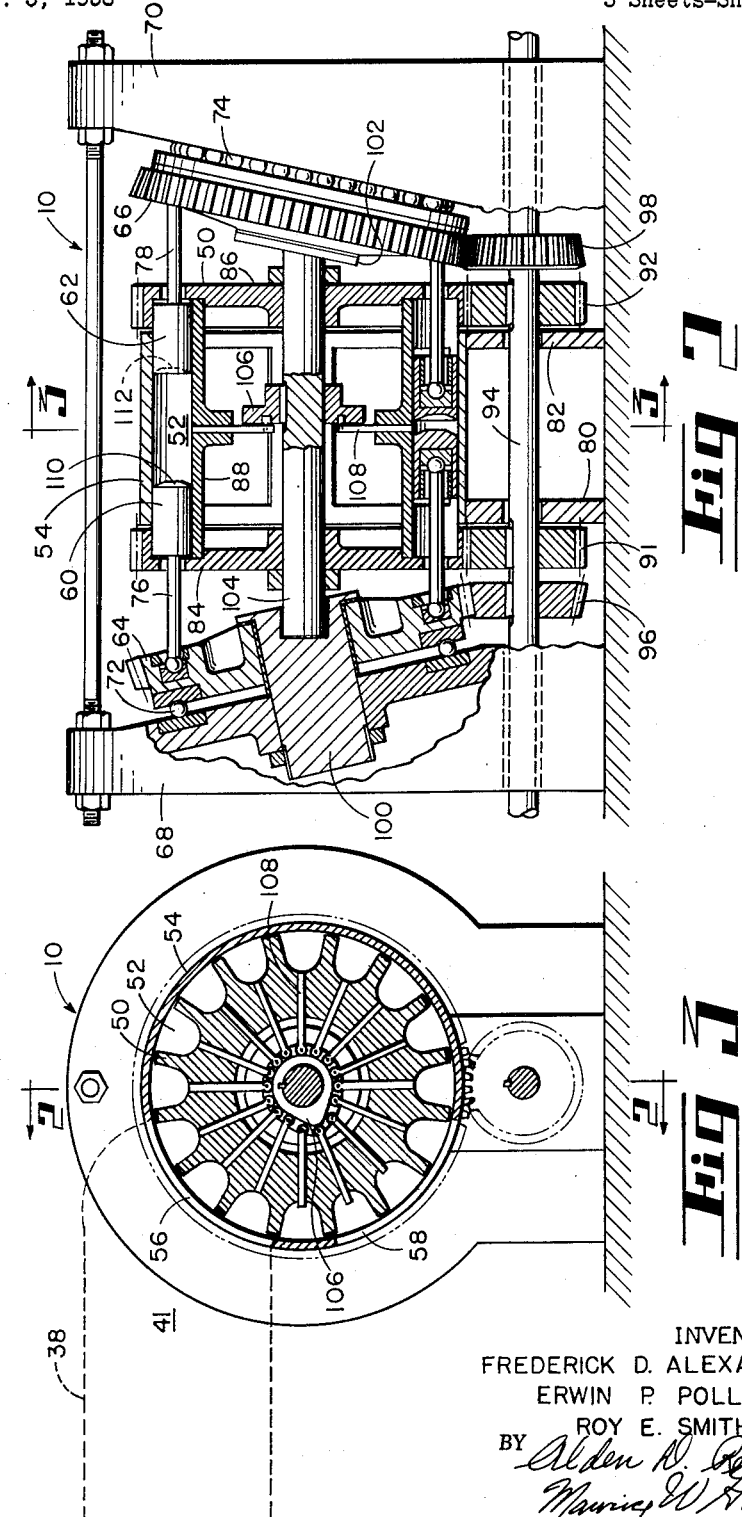
INVENTORS.
FREDERICK D. ALEXANDER.
ERWIN P. POLLITT.
ROY E. SMITH.
BY
ATTORNEYS.

Nov. 21, 1961   F. D. ALEXANDER ET AL   3,009,413
PELLETING MECHANISM
Filed Feb. 3, 1958   3 Sheets-Sheet 3

INVENTORS.
FREDERICK D. ALEXANDER.
ERWIN P. POLLITT.
ROY E. SMITH.
BY
ATTORNEYS.

3,009,413
PELLETING MECHANISM

Frederick D. Alexander and Erwin P. Pollitt, Chicago, and Roy E. Smith, Villa Park, Ill., assignors, by mesne assignments, to Avco Manufacturing Corporation (New Idea Division), Coldwater, Ohio, a corporation of Delaware Filed Feb. 3, 1958, Ser. No. 712,881
2 Claims. (Cl. 100—218)

This invention relates to improvement in mechanism for pelleting crop material (such as hay), and has particular relation to the pellet-making unit itself, of a type which can be used in a field unit if desired.

It is an important consideration in all types of farm machinery of modern design to eliminate as much as possible the labor involved in handling crop material which requires transportation and handling from the field. The most common present-day method of handling hay is to bale the hay, by means of a baler transported over the field, into bales weighing from 60 to 70 pounds, and sometimes more, and to drop the bales thus formed over the field to be later picked up; or, as is also common, a wagon may be pulled behind the baler and the wagon directly loaded with the bales and transported to the barn to be unloaded. In either case, a considerable amount of labor is involved in lifting the individual bales and loading them first on a wagon and then later removing them from the wagon and placing them on an elevator and into the barn, and then piling them in a place in the barn. Furthermore, when the hay is fed to the animals, it is necessary for the bales to be again moved about and broken apart.

It is a primary object of this invention to provide mechanism for pelleting crop material (such as hay) into small pellets—an illustration being pellets of the order of 3 inches in dameter by, say, ½ to 1 inch thick. These small pellets are then ready to be consumed by farm animals, and the small pellets themselves are sufficiently compacted to hang together and to be handled by bulk handling methods and adapted for storing in minimum of storage space. Such a machine should form these pellets in the field and discharge them from a conveyor into a large box carried on a wagon, which would thus afford bulk handling of this material. Such handling would be accomplished without the use of an additional man or men for handling the material, the handling being effected by conveyor units both into the conveying wagon and onto conveyors in the barn. Further conveyors might be used in the barn, if desired, for feeding the animals, thereby limiting to a large extent the manual handling of baled material, eliminating the breaking apart of the material in preparation for feeding, and thus greatly reducing the labor required.

It is a further object of the present invention to provide a mechanism for forming pellets which will be suitable for handling, that is, will be sufficiently stable and compacted into pellets which can be handled by bulk handling methods without breaking apart and which will have a uniform density and will be of such consistency that they can be consumed by animals and will have a form such as to be stable after compacting and therefore able to be handled by conveyors and other bulk handling methods without the objectional formation of broken particles.

It is a further object to provide a mechanism which will make it possible to pellet hay in a continuous process, with mechanism which is operable and practical on a field-type unit, and which will compact a column of hay of the order of 8 inches long by 3 inches in diameter to a dish-shaped pellet, such, for illustration, as 3 inches in diameter by approximately ½ to 1 inch thick.

It is a further object to provide mechanism which will compact a pellet by a single stroke of a piston or pistons, and in order to reduce the stroke and to make possible mechanism which will accomplish the desired results it has been found advantageous that double oppositely acting pistons be provided of approximately half the stroke which would be required for a single piston operating in a cavity.

It is a further object to provide a plural cavity unit for compacting to operate continuously with a number of pellets in various stages of formation at the same time, thus making it possible to feed continuously and to operate in a mechanism capable of producing relatively large quantities of these pellets in a relatively short time.

The following are some general features of an illustrative embodiment of a pelleting mechanism:

A suitable pellet can be produced by compacting a column of hay received in a cavity approximately 8 inches long by 3 inches in diameter, although this size is merely illustrative of one embodiment. This amount of material is compressed by a single stroke compression mechanism to a thickness of the order of ½ inch by 3 inches in diameter. Such a mechanism also requires, for best results as to uniform density and satisfactory compaction of the pellet, that a so-called dish-shaped pellet be formed by a projection on one of the surfaces producing the compaction and a recessed or concave shape on the other retaining member.

This pelleting mechanism may be constructed employing a cylinder which is set to rotate at right angles to the flow of chopped material. On the periphery of this drum or cylinder, and parallel to the axis of rotation of the drum, there are provided spaced open cavities extending longitudinally the length of the drum, with their faces open and substantially semi-circular in cross-section at the bottom and extending upwardly to the diameter of the cavity, making a cross-section of cavity of substantially heel-shaped. These cavities have opposed pistons mounted to reciprocate therein and so mounted as to move opposite to each other; in other words, their maximum distance apart is approximately 8 inches, and they are actuated to move towards each other to compress this 8 inch column of material received in each cavity to a pellet of approximately ½ inch thick. Such a mechanism may be actuated by so-called wobble plates connected by connecting rods to the pistons at each end of the rotatable cylinder. The cylinder is rotated by gear mechanism, and the cylinder is also covered by a cylindrical hollow housing which closes the faces of the cavities, except for the inlet and the outlet, so that when the material enters into the cavity at the inlet, the pistons are at their maximum distance apart, namely about 8 inches, and as the cylinder rotates continuously the pistons move toward each other as the filled cavities move under the housing and away from the inlet and toward the outlet. During the movement from the inlet to the outlet, the compression from 8 inches to ½ inch is completed by the movement of the pistons toward each other. As the pistons reach the outlet, the completed compacted pellets are ejected by ejector pins which extend into the bottom of each cavity at the point where the compaction is completed. These ejector pins are actuated to push the completed pellet out of the cavity by a cam mechanism which moves the ejector pins at that point.

The above and other objects of this invention will appear more fully from a more detailed description of an illustrative mechanism and which will be described by reference to the accompanying drawings, and wherein:

FIGURE 2 is a longitudinal section through a pelleting unit.

FIGURE 3 is a cross-section on line 3—3 of FIGURE 2.

Figure 1:
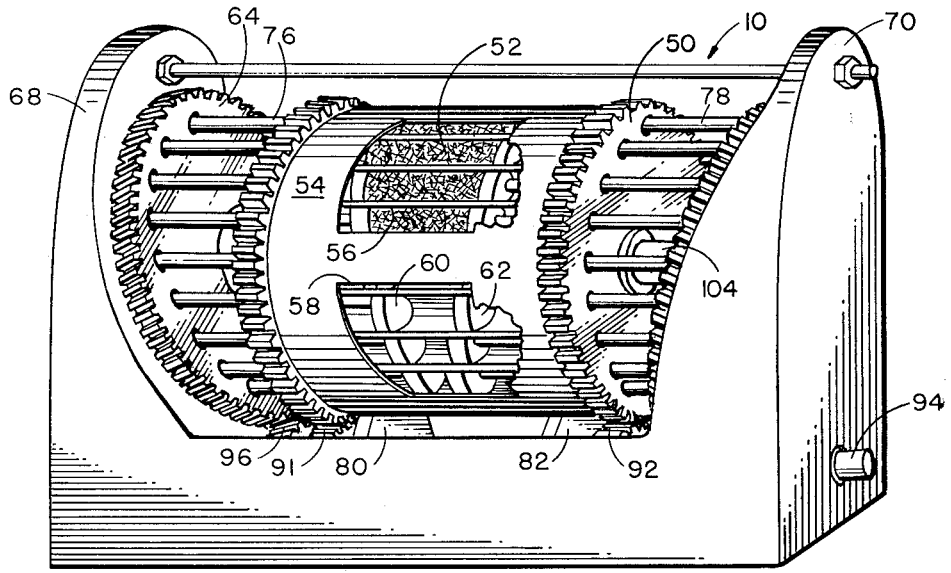
FIGURE 1 is a perspective view of a pelleting unit showing a cylindrical multi-cavity mechanism for compacting hay into pellets.
Figure 4:
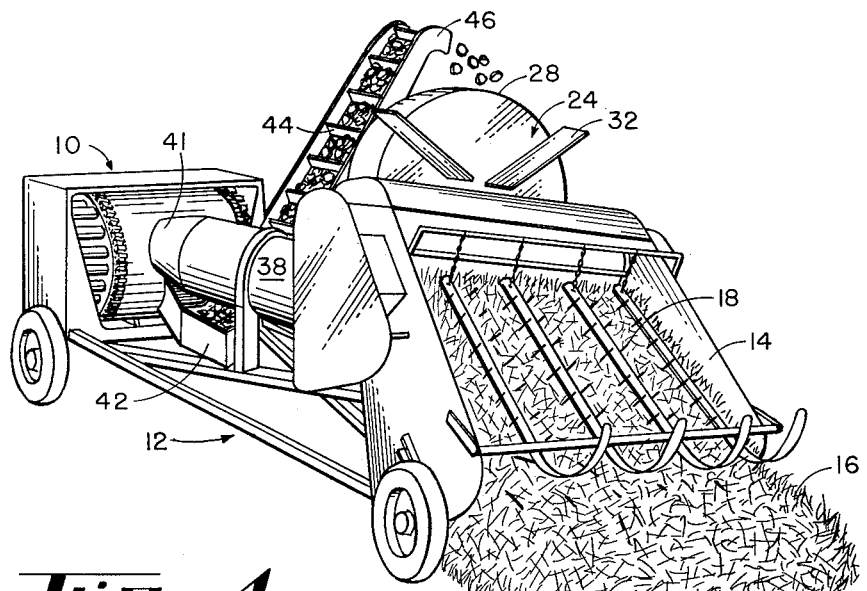
FIGURE 4 is a perspective view of a field unit on which the pelleting-making unit of this invention might be employed.
Figure 5:
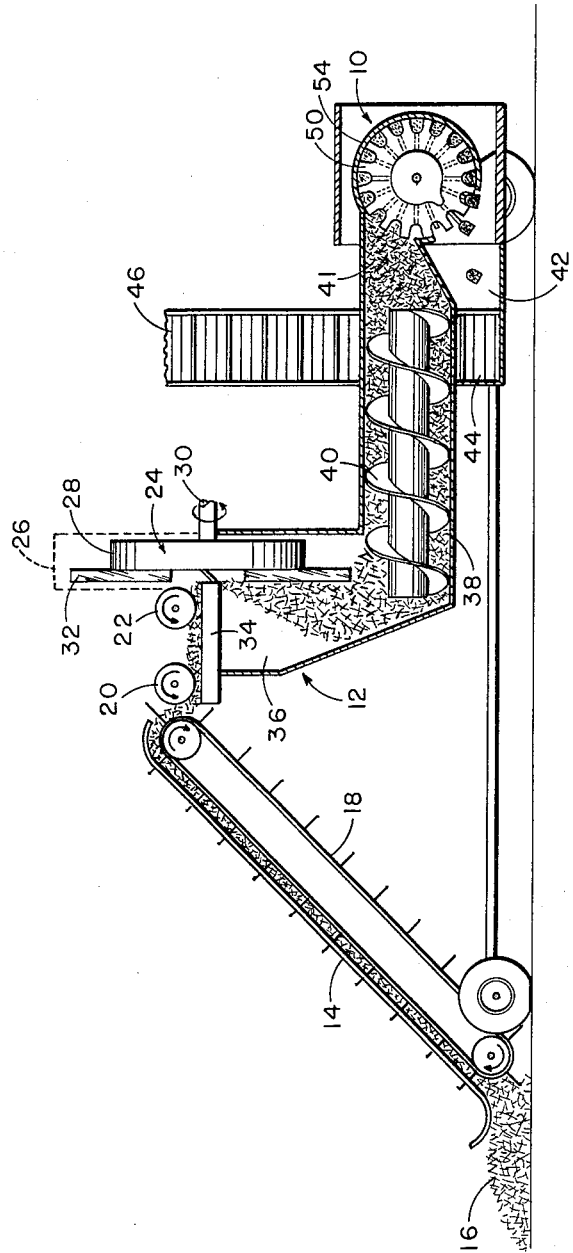
FIGURE 5 is a partially diagrammatic sectional view showing the path of flow of hay to a field unit of the type shown in FIGURE 4.

In FIGURES 1, 2 and 3 there is shown the structure of a pellet-making unit 10 of this invention. Such unit is intended for and might be used as a part of a field unit 12 such as shown in FIGURES 4 and 5, designed to be drawn by a tractor over a field and wherein a pickup unit 14, of the general type used in harvesters, is employed to gather cured or partially cured hay from a windrow 16. The hay thus picked up is carried upwardly along a conveyor 18 as the entire field unit 12 moves along the ground, as powered and pulled by a tractor or other source of power not shown. The hay thus carried up the conveyor goes under suitable feeding rollers 20, 22 and is fed into chopping unit 24, which may be of the general type used in forage harvesters for chopping crop material. This chopping unit 24 comprises a housing 26, which carries a rotor 28 rotated by shaft 30 carrying a plurality of cutting knives 32 past a stationary knife 34 chopping the hay into short lengths. The chopped material is fed into the hopper 36, which feeds a conveyor chamber 38. An auger 40 illustrates a means which carries the chopped hay rearwardly to outlet end 41 and into pelleting unit 10. After pellets are completed they drop into hopper 42 and are picked up by conveyor 44 and carried to the top 46 of this conveyor and fall into an adjacent receptacle, which may be a wagon or other unit adjacent the machine for receiving the pellets for further handling.

Having thus described the general arrangement of the machine in which the pelleting unit might be used, a more detailed description of the actual pelleting mechanism follows:

Referring to FIGURES 1, 2, 3 and 5:

A rotatable cylinder 50 is positioned with its axis at right angles to the outlet 41 of the conveyor chamber 38, which contains chopped material ready to be fed to the pelleting mechanism 10. This rotatable cylinder 50 has a plurality (here shown sixteen) of cavities 52 extending longitudinally of the cylinder on the periphery of such cylinder. The cavities are of a shape such that the bottom portion of the cavity is substantially a half-cylindrical shape, and the outer extending walls of the cavity extend to form open cavities and to expose the entire width of each cavity on the periphery of the cylinder 50. The entire outer surface of the cylinder 50 is surrounded by a hollow cylindrical housing 54. This housing serves to cover the cavities 52, except at two regions in the periphery of the cylinder, the housing being stationary. These two exposed regions are an inlet region 56 and an outlet region 58. It is thus apparent that the housing surrounding the cylinder 50, except for the inlet and the outlet, as abovementioned, closes the face of each of the 16 cavities and provides a hollow closed cavity. There are sixteen such columnar cavities spaced around the periphery of the cylinder 50; and it is also apparent that the inlet 56, being aligned with the outlet 41 of the conveyor chamber, is positioned to receive, in the cavities at that region, material which is discharged from the outlet, and this material is fed into successive cavities as the cylinder 50 rotates and these cavities pass the inlet region.

Positioned in each of the cavities is a pair of pistons 60, 62. A pair of these pistons 60, 62 are positioned in each of the sixteen cavities and are mounted to slide in these cavities. As the cylinder 50 rotates, these pistons are caused to move toward each other—that is, as shown in FIGURE 2, the position of the pistons are as shown at the top cavity of FIGURE 2, a maximum distance apart. However, as the cylinder 50 rotates (see FIGURE 3) in a clockwise direction as shown in FIGURE 3, the pistons are caused to move toward each other and to compress the material carried in the cavities as the cavities rotate. It is evident that this rotation causes other cavities to come into alignment with the inlet 56, and as this happens, the continuous feeding of material from the conveyor chamber 38 causes these cavities to be successively filled, and as the cylinder rotates there is a continuous filling and a continuous successive compression of the material in the cavities. As the cylinder reaches the bottom position (as shown in FIGURE 2), the two pistons will be at their closest position toward each other and will have compressed the material to the volume of the small clearance between the two pistons. Such a compression is the act of pelleting material which was fed into the inlet and into the cavities, and as the rotation continues the pellets are then in a compressed condition and they rotate to the outlet 58 and are there ejected by a mechanism which will be more fully described below.

The mechanism for reciprocating the pistons 60, 62 in each cavity in the successive movement towards and away from each other to compress the material in each cavity as above described is accomplished by two wobble plates 64, 66, which are mounted for rotation on inclined end members 68, 70. This construction is shown in the cross-section in FIGURE 2. It is noted that the wobble plates 64, 66 are mounted to rotate on ball races or bearing surfaces 72, 74. The wobble plate members are connected to the cylinders by connecting rods 76, 78, one representative pair of these rods being shown at the top and another pair at the bottom in FIGURE 2; it being understood that there are sixteen pairs of these connecting rods, one for each pair of pistons 60, 62. The rods are connected at their ends to wobble plates 64, 66 and to the pistons 60, 62 by ball-and-socket joints, as shown, and therefore as the cylinder 50 is rotated the inclined position of the wobble plates causes a reciprocating movement of the pistons in the manner shown.

The previously mentioned housing 54, which is stationary, is supported on frame members 80, 82, and the previously mentioned cylinder 50 is made up of end plates 84, 86 and outer cylinder member 88. This unit, being secured together with the cavity units 52 formed in the cylindrical portion 88 to form a unitary cylindrical unit, is rotated by gears 91, 92 carried on shaft 94, the rotation of which shaft causes the cylinder 50 to rotate. The two wobble plates 64, 66 are also rotated by two gears 96, 98. The two wobble plates 64, 66 are mounted on stub shafts carried in the end members 68, 70. These stub shafts are numbered 100, 102, and are stationary and carry the wobble plates 64, 66 for rotation. There is provided between these two stub shafts a stationary shaft 104 which extends inside the cylinder member 50, and this shaft 104 carries at its center a cam track member 106. This cam track member 106 carries a plurality of ejector pins 108. As shown in FIGURE 3, these ejector pins are 16 in number, one for each cavity 52, and these pins are provided with roller cam followers carried in the cam track 106. The track of the cam, as shown in FIGURE 3, provides that on rotation of the cylinder member 50, the ejector pins will be caused to project outwardly in the region of the outlet 58; in other words, the only necessity for movement of the ejector pins 108 is to eject the pellets in the region of the outlet 58, and they are thus caused to project outwardly to produce this ejection of the completed pellet.

Consideration will now be given to the shape of the ends of pistons 60, 62. In experimental work, in determining the best method for compacting material to form pellets, it was determined that the most satisfactory condition of uniform density of the compacted pellet was obtained when the members between which the pellet is compressed were so formed that there was a projection on one of the members and a cavity on the opposite one. Therefore, the pistons in these cavities 60, 62 are so formed that one of them is provided with a projection and one of them with a cavity (see projection 110 on piston 60, and cavity 112 on piston 62). The result of this arrangement makes a so-called dish-shaped pellet. The provision of a projection and an opposed cavity on the piston ends causes a certain amount of thrust radially outward during the compression of the pellet, and results in an improved edge compaction of the pellet.

It is noted that in the mechanism illustrated there are two pistons 60, 62, instead of one piston and a stationary abutment or anvil. Such a structure is used to reduce the stroke of each of the pistons, as double the stroke would otherwise be required on a single piston to compress the same column of material. Although this form of invention is considered as having certain advantages, it is pointed out that it is within the scope of this invention to provide a mechanism with one piston in each cavity with attendant reduction in mechanism. It is evident that in the feeding of material, as the mechanism including cylinder 50 rotates continuously, there is an uninterrupted feeding of material and a continuous compression of the material in the cavities so there is a series of cavities in partial and different stages of compression as the cylinder rotates and there is a continuous feeding of material into empty cavities as well as a continuous and successive discharge of compacted pellets from the outlet 58.

Although the invention has been illustrated by reference to specific mechanism, it is contemplated that modifications will be made therein without departing from the fundamental principles and within the scope of the following claims.

We claim:

1. In a pellet forming mechanism for forage crops, in combination, a hollow cylindrical housing having an inlet opening and an outlet opening, a cylindrical member mouted for rotation relative to said housing and carried within said housing and having walls forming a series of longitudinal cavities exposed and open on one side thereof on rotation past said inlet and said outlet openings, and mechanism comprising oppositely disposed pistons sliding between said walls in said compacting cavities of said rotating member and positioned to be at maximum distance away from each other as said cavities pass said inlet opening and to be pushed towards each other as said mechanism rotates towards said outlet opening and further means adapting said pistons to be moved away from each other on reaching said outlet opening, and mechanism comprising a member to push said compacted pellets out of said cavities through said open side as said cavities reach said outlet opening.

2. In a pellet-forming mechanism, a rotating drum and a series of longitudinal projections on said drum forming a plurality of crop material receiving cavities on the periphery of the drum, a hollow stationary member directly surrounding the periphery of said drum and covering the outside of said cavities except for an inlet region and an outlet region, mechanism for compacting said material in said cavities, said mechanism comprising a pair of slidable compacting pistons oppositely positioned in each of said cavities and operating mechanism for moving said pistons comprising means for moving said pistons toward and away from each other in successive stages of movement in said cavities, opposing compacting faces of said pistons having a concave form on one of said pistons and a convex form on the other of said pistons, thereby to produce a compacted pellet of dish-shaped formation and of near uniform density when material is fed into said cavities at the said inlet region and said pistons are moved toward each other in compacting relationship.

References Cited in the file of this patent

UNITED STATES PATENTS

| | | |
|---|---|---|
| 215,006 | Lampert | May 6, 1879 |
| 532,891 | Mellen | Jan. 22, 1895 |
| 723,150 | Fenn | Mar. 17, 1903 |
| 876,037 | Bingham | Jan. 7, 1908 |
| 1,026,682 | Komarek | May 21, 1912 |
| 1,752,644 | Laying | Apr. 1, 1930 |
| 1,920,445 | Thurlings | Aug. 1, 1933 |
| 2,157,467 | Thurlings | May 9, 1939 |
| 2,157,528 | Crabtree | May 9, 1939 |
| 2,716,318 | Skromme | Aug. 30, 1955 |
| 2,833,633 | Hecht | May 6, 1958 |
| 2,865,311 | Thurlings | Dec. 23, 1958 |

FOREIGN PATENTS

| | | |
|---|---|---|
| 333 | Great Britain | 1912 |